US011292859B2

(12) United States Patent
Klein et al.

(10) Patent No.: US 11,292,859 B2
(45) Date of Patent: Apr. 5, 2022

(54) METHOD FOR PRODUCING A POLYMER BY NITROXYL-CONTROLLED POLYMERISATION, AND POLYMER

(71) Applicant: FRAUNHOFER-GESELLSCHAFT ZUR FÖRDERUNG DER ANGEWANDTEN FORSCHUNG E. V., Munich (DE)

(72) Inventors: Roland Klein, Ob.-Ramstadt (DE); Markus Mazurowski, Ginsheim-Gustav (DE); Konrad Burlon, Weiterstadt (DE); Matthias Wittemann, Darmstadt (DE); Rudolf Pfaendner, Rimbach (DE)

(73) Assignee: Fraunhofer-Gesellschaft zurförderung der angewandten Forschung e.V., Munich (DE)

( * ) Notice: Subject to any disclaimer, the term of this patent is extended or adjusted under 35 U.S.C. 154(b) by 263 days.

(21) Appl. No.: 16/344,830

(22) PCT Filed: Oct. 27, 2017

(86) PCT No.: PCT/EP2017/077626
§ 371 (c)(1),
(2) Date: Apr. 25, 2019

(87) PCT Pub. No.: WO2018/078108
PCT Pub. Date: May 3, 2018

(65) Prior Publication Data
US 2019/0248927 A1 Aug. 15, 2019

(30) Foreign Application Priority Data
Oct. 28, 2016 (DE) ..................... 10 2016 221 346.6

(51) Int. Cl.
C08F 212/14 (2006.01)
C08F 12/22 (2006.01)
C08F 8/12 (2006.01)
C08F 2/38 (2006.01)
C08F 212/08 (2006.01)
C08K 5/32 (2006.01)
C08K 5/3417 (2006.01)
C08K 5/12 (2006.01)
C08K 5/14 (2006.01)
(Continued)

(52) U.S. Cl.
CPC ............ C08F 212/24 (2020.02); C08F 2/38 (2013.01); C08F 8/12 (2013.01); C08F 12/22 (2013.01); C08F 212/08 (2013.01); C08F 212/22 (2020.02); C08K 5/32 (2013.01); C08K 5/3417 (2013.01); C08F 2438/02 (2013.01); C08F 2500/02 (2013.01); C08F 2500/03 (2013.01); C08F 2810/40 (2013.01); C08K 5/12 (2013.01); C08K 5/14 (2013.01); C08K 5/23 (2013.01); C08K 5/3435 (2013.01)

(58) Field of Classification Search
CPC ... C08K 5/12; C08K 5/14; C08K 5/23; C08K 5/32; C08K 5/34; C08K 5/3412; C08K 5/3417; C08K 5/3432; C08K 5/3435; C08K 5/3437; C08F 2810/40; C08F 2500/00; C08F 2500/01; C08F 2500/02; C08F 2500/03; C08F 2500/055; C08F 2438/00; C08F 2438/01; C08F 2438/02; C08F 2810/00; C08F 212/00; C08F 212/02; C08F 212/04; C08F 212/06; C08F 212/08; C08F 212/10; C08F 212/1422; C08F 212/24; C08F 212/26; C08F 212/28; C08F 12/22; C08F 12/24; C08F 12/26; C08F 12/28; C08F 8/12; C08F 8/30; C08F 8/32; C08F 2/38
See application file for complete search history.

(56) References Cited

U.S. PATENT DOCUMENTS

| 4,898,916 A | 2/1990 | Gupta | |
| 6,107,425 A * | 8/2000 | Sinta | C08F 12/24 526/213 |
| 10,138,354 B2 | 11/2018 | Groos et al. | |

(Continued)

FOREIGN PATENT DOCUMENTS

| EP | 0 542 523 A1 | 5/1993 |
| EP | 1 479 700 A1 | 11/2004 |

(Continued)

OTHER PUBLICATIONS

Harth, et al., "Chain End Functionalization in Nitroxide-Mediated "Living" Free Radical Polymerizations", Macromolecules, 34, 3856-3862, Apr. 28, 2001. (Year: 2001).*

(Continued)

Primary Examiner — Christopher M Rodd
(74) Attorney, Agent, or Firm — Leydig, Voit & Mayer, Ltd.

(57) ABSTRACT

The invention relates to a method for producing a polymer by means of nitroxyl-controlled polymerisation. According to the invention, a mixture is initiated which contains at least one radically polymerisable monomer and additionally contains at least one initiator, at least one reactive agent that converts at least one portion of the alkoxyamine end groups produced during the radical polymerisation into a non-polymerisable group, and at least one additive that accelerates the hydroxyl-controlled polymerisation and/or the conversion of the alkoxyamine end groups into a non-polymerisable group.

18 Claims, No Drawings

(51) Int. Cl.
*C08K 5/23* (2006.01)
*C08K 5/3435* (2006.01)

(56) References Cited

U.S. PATENT DOCUMENTS

| | | | |
|---|---|---|---|
| 10,214,631 B2 | 2/2019 | Pfaendner et al. | |
| 2004/0002606 A1 | 1/2004 | Detrembleur et al. | |
| 2005/0004310 A1 | 1/2005 | Hong et al. | |
| 2007/0225470 A1* | 9/2007 | Di | C08F 293/005 528/196 |
| 2008/0280070 A1* | 11/2008 | Knischka | C09D 7/47 427/595 |
| 2016/0052927 A1 | 2/2016 | Pfaendner et al. | |
| 2016/0272789 A1 | 9/2016 | Pfaendner et al. | |
| 2017/0107375 A1 | 4/2017 | Pfaendner et al. | |
| 2017/0121499 A1 | 5/2017 | Pfaendner et al. | |
| 2017/0260362 A1 | 9/2017 | Pfaendner et al. | |
| 2017/0260363 A1 | 9/2017 | Pfaendner et al. | |
| 2017/0260366 A1 | 9/2017 | Pfaendner et al. | |
| 2017/0267835 A1 | 9/2017 | Groos et al. | |
| 2018/0186970 A1 | 7/2018 | Groos et al. | |

FOREIGN PATENT DOCUMENTS

| | | |
|---|---|---|
| EP | 1 572 751 B1 | 6/2010 |
| JP | H06-32818 A | 2/1994 |
| JP | 2000-026535 A | 1/2000 |
| JP | 2004-067680 A | 3/2004 |
| JP | 2006-506480 A | 2/2006 |
| JP | 2007-518843 A | 7/2007 |
| JP | 2010-525148 A | 7/2010 |
| JP | 2017-507237 A | 3/2017 |
| WO | WO 2004/044017 A1 | 5/2004 |
| WO | WO 2005/059048 A1 | 6/2005 |
| WO | WO 2008/134131 A1 | 11/2008 |
| WO | WO 2015/134591 A1 | 9/2015 |

OTHER PUBLICATIONS

Jianying, et al. "Some Novel Accelerating Agents for Nitroxide-Mediated Living Radical Polymerization", Journal of Polymer Science Part A: Polymer Chemistry, 43, 5246-5256, 2005. (Year: 2005).*
Japan Patent Office, Notification of Reasons for Refusal in Japanese Patent Application No. 2019-522751 (dated Oct. 27, 2020).
Korean Patent Office, Notification of Reason for Refusal in Korean Patent Application No. 10-219-7011923 (dated Apr. 24, 2020).
Anger et al., "Organic-Inorganic Hybrid Nanoparticles via Photoinduced Micellation and Siloxane Core Cross-Linking of Stimuli-Responsive Copolymers," *ACS Macro Lett.* 2(2): 121-124 (2013).
Areephong et al., "Triazine-mediated controlled radical polymerization: new unimolecular initiators," *Polym Chem.* 7: 370-374 (2016).
Barclay et al., "The "Living" Free Radical Synthesis of Poly(4-hydroxystyrene): Physical Properties and Dissolution Behavior," *Macromolecules* 31(4): 1024-1031 (1998).
Gao et al., "Living atom transfer radical polymerization of 4-acetoxystyrene," *Macromolecular Rapid Communication* 18(12): 1095-1100 (1997).
Guillaneuf et al., "Radical Chain End Chemical Transformation of SG1-Based Polystyrenes," *Macromolecules* 43(1): 91-100 (2010).

Jianying et al., "Some Novel Accelerating Agents for Nitroxide-Mediated Living Free-Radical Polymerization," *Journal of Polymer Science Part A: Polymer Chemistry* 43(21): 5246-5256 (2005).
Leuschner et al., "Photolithography," Chapter 4, *Handbook of Semiconductor Technology*, Kenneth Jackson, Wolfgang Schroter, Editors, Wiley-VCH Verlag GmbH, pp. 177-263 (2000).
Malmström et al., "Development of a New Class of Rate-Accelerating Additives for Nitroxide-Mediated 'Living' Free Radical Polymerization," *Tetrahedron* 53(45): 15225-15236 (1997).
Malz et al., "Reactions for selective elimination of TEMPO end groups in polystyrene," *Macromol. Chem. Phys.* 199(4): 583-588 (1998).
Messerschmidt et al., "Synthesis of Partially Protected Block Copolymers Based on 4-Hydroxystyrene Using NMRP and a Sequence of Polymer Analogous Reactions," *Macromolecules* 41(8): 2821-2831 (2008).
Nicolas et al., "Nitroxide-mediated polymerization," *Progress in Polymer Science* 38(1): 63-235 (2013).
Petton et al., "From one-pot stabilisation to in situ functionalisation in nitroxide mediated polymerisation: an efficient extension towards atom transfer radical polymerization," *Polym. Chem.* 3(7): 1867-1787 (2012).
Steppan et al., "Imaging Technology, 4. Imaging for Electronics," *Ullmann's Encyclopedia of Industrial Chemistry*, Wiley-VCH, 2012 pp. 1-16 (2012).
Korean Patent Office, Notification of Reason for Refusal in Korean Patent Application No. 10-219-7011923 (dated Sep. 11, 2020).
*Controlled and Living Polymerizations, Methods and Materials*, Axel Müller, Krzysztof Matyjaszewski, Editors, Wiley-VCH Verlag GmbH & Co. KGaA, 2009 (table of contents only) 21 pgs.
Leuschner et al., "Photolithography," *Handbook of Semiconductor Technology*, vol. 2, Chapter 4, pp. 177-264, Kenneth A. Jackson, Wolfgang Schröter, Editors, Wiley-VCH Verlag GmbH & Co. KGaA, 2009 (table of contents only—8 pgs).
Mack, "Fundamental Principles of Optical Lithography: the Science of Microfabrication," John Wiley & Sons, Ltd. (table of contents only) 14 pgs.
Wang et al., "Synthesis of Narrow Molecular Weight Distribution Norbornene-Lactone Functionalized Polymers by Nitroxide-Mediated Polymerization: Candidates for 193-nm Photoresist Materials," *Polymers* 6: 565-582 (2014).
European Patent Office, International Search Report in International Application No. PCT/EP2017/077626 (dated Jan. 16, 2018).
European Patent Office, Written Opinion in International Application No. PCT/EP2017/077626 (dated Jan. 16, 2018).
International Bureau of WIPO, International Preliminary Report on Patentability in International Application No. PCT/EP2017/077626 (dated May 9, 2019).
Baumann et al., "Acetic Anhydride—Accelerating Agent for Nitroxide-Controlled Free-Radical Copolymerization of Styrene and Acrylonitrile," *Macromolecular Chemistry and Physics* 202(13): 2727-2731 (2001).
Chessa et al., "Synthesis of three- and six-arms polystyrene via living / controlled free radical polymerisation," *Polymer* 42(23): 9347-9353 (2001).
European Patent Office, Notification under Article 94 (3) EPC in European Patent Application No. 17 800 409.9 (dated May 13, 2020).
European Patent Office, Notification under Article 94 (3) EPC in European Patent Application No. 17 800 409.9 (dated Mar. 26, 2021).
Japan Patent Office, Notification of Reasons for Refusal in Japanese Patent Application No. 2019-522751 (dated Jun. 29, 2021).

* cited by examiner

METHOD FOR PRODUCING A POLYMER BY NITROXYL-CONTROLLED POLYMERISATION, AND POLYMER

CROSS-REFERENCE TO RELATED APPLICATIONS

This patent application is the U.S. national phase of International Application No. PCT/EP2017/077626, filed on Oct. 27, 2017, which claims the benefit of German Patent Application No. 10 2016 221 346.6, filed Oct. 28, 2016, the disclosures of which are incorporated herein by reference in their entireties for all purposes.

The present invention relates to a process for preparing a polymer by nitroxyl-controlled polymerization. In this process, a mixture comprising at least one radically polymerizable monomer and additionally comprising at least one initiator, at least one reactive agent, which converts at least a portion of the alkoxyamine end groups, generated in the radical polymerization, into a non-polymerizable group, and also at least one additive accelerating the hydroxyl-controlled polymerization and/or the conversion of the alkoxyamine end groups into a non-polymerizable group, is initiated.

Photolithography is an essential step in the operation of fabricating electronic semiconductor components. In this procedure, for generating the necessary structures, substrates are coated with a photoresist and subsequently exposed through a mask. In the case of a positive resist, the exposure operation causes a change in the chemical structure which makes the exposed portion soluble for certain solvents, while the unexposed portion remains insoluble. In the case of a negative resist, in contrast, the exposed portion becomes insoluble as a result of the crosslinking of a polymer. Through subsequent treatment with a selective solvent, the soluble portion is removed, laying bare the substrate beneath the resist for further selective treatment. Photoresists consist at least of a photosensitive agent and a polymeric binder whose solubility is modified in the exposed areas by the photosensitive agent.

For the production of ever more compact and highly performing electronic devices, there is a need for increasingly rising density of components, thus necessitating ever smaller structures. Consequently, the requirements made of the binder in the photoresist also rise—it must be capable of imaging these structures, which may lie within an order of magnitude range from a hundred to a few hundred nanometres. Sharply defined imaging of the structures requires the binder to possess a narrow molecular weight distribution, since broad molecular weight distributions lead to local differences in solubility and therefore fine structures may not be imaged with sharp definition. A further important requirement made of the binder is an extremely low concentration of impurities caused by metal ions, so as not to possess electrical conductivity and so as not to cause any deterioration in exposability because of coloured metal ions. Furthermore, the binder must be thermally stable, so that its chemical composition or molecular weight distribution is not altered by the temperatures prevailing during processing, which may amount to 130° C., for example. Also important is a production process which can be carried out economically. These product objectives are described in, for example, U.S. Pat. No. 6,107,425; EP 0542523 A1, C. Mack "Fundamental Principles of Optical Lithography: The Science of Microfabrication" John Wiley & Sons Ltd, Chichester, 2007; H. Steppan, D. C. Mammato, T. Stoudt, M. C. P. Watts "Imaging Technology, 4. Imaging for Electronics" in "Ullmann's Encyclopedia of Industrial Chemistry" Wiley-VCH, Weinheim, 2012 or Z. J. Wang, M. Maric, Polymers 2014, 6, 565-582.

Examples of polymers suitable as binders for photoresists are polymers of 4-hydroxystyrene and its derivatives having the general formula shown below, including in combination with various other monomers.

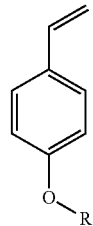

The residue R in this formula may be hydrogen, an alkyl group or an acyl group. The aromatic and olefinic protons of the styrene derivative shown above may also be substituted by other residues. Comonomers described include styrene and also various acrylates and methacrylates.

Detailed descriptions of polymers that may be suitable for this application are found in numerous review articles and book chapters, such as, for example, in: R. Leuschner, G. Pawlowski "Photolithography" in "Handbook of Semiconductor Technology—Volume 2" K. A. Jackson, W. Schroter (Eds.), Wiley VCH, 2000.

The preparation of polymers from vinyl monomers with a narrow molecular weight distribution is likewise state of the art and described in publications and books, such as, for example, in A. H. E. Müller, K. Matyjaszewski "Controlled and Living Polymerizations" Wiley VCH, 2009. Suitable polymerization technologies for this purpose include living, ionic polymerizations and also controlled radical polymerizations. The ionic polymerizations include anionically and cationically initiated polymerization. Examples of controlled radical polymerizations are ATRP (Atom Transfer Radical Polymerization), RAFT (Reversible Addition-Fragmentation Transfer) polymerization or NMP (Nitroxide-Mediated Polymerization). The known processes recited here for preparing polymers with narrow molecular weight distribution have already been described for the synthesis of binders for photoresists. The binders can also be produced with the conventional free radical polymerization, which, however, results in polymers having broad molecular weight distributions.

With all of the methods described, homo- and copolymers of 4-hydroxystyrene are not polymerizable directly. For this reason, poly(4-hydroxystyrene) and its copolymers are prepared in general via an at least two-stage process. Here, first of all, derivatives of 4-hydroxystrene wherein the phenolic OH group is provided with substitution by a group which does not engage in the polymerization reaction (protecting group) are polymerized, optionally together with other monomers, by one of the processes described. Then, in a polymer-analogous reaction, the protecting groups of the resultant polymers are removed, to give poly(4-hydroxystrene) and its copolymers. U.S. Pat. No. 4,898,916 A describes, for example, the acid-catalysed, polymer-analogous reaction of poly(4-acetoxystyrene) and its copolymers to give poly(4-hydroxystrene) and the corresponding copolymers.

JP 1992-209661 describes, for example, the anionic polymerization of 4-methoxymethoxystyrene and also the subsequent polymer-analogous reaction of the resulting polymer to give poly(4-hydroxystrene). Disadvantageous features of this process are the cost and complexity of the apparatus and the exacting requirements imposed on the purity of the monomers and solvents.

Substantially less exacting in their requirements regarding the purity of the monomers, and also more simple to carry out technically, are the controlled radical polymerizations. B. Gao., X. Chen, B. Ivan, J. Kops and W. Batsberg, for example, in Macromol. Rapid Commun. 1997, 18, 1095-1100, describe the polymerization of 4-acetoxystyrene by ATRP to give poly(4-acetoxystyrene) with a narrow molecular weight distribution. This polymer can subsequently be subjected to polymer-analogous hydrolysis to give poly(4-hydroxystrene).

In another example (EP 1479700 A1), poly(4-hydroxystrene) and its copolymers with a narrow molecular weight distribution are prepared by radical polymerization of protected 4-hydroxystyrene in the presence of a chain transfer agent (RAFT polymerization) and subsequent polymer-analogous deprotection of the phenolic OH group. Both processes have disadvantages for the use of the resultant polymers as binders for photoresists, with regard to purity or molecular weight distribution.

Another example of a controlled radical polymerization which enables the synthesis of protected 4-hydroxystyrene derivatives, optionally together with other monomers as well, is that of NMP. The progress of the radical polymerization in this case is controlled by the presence of a persistent nitroxide radical by virtue of the fact that the latter is able to recombine reversibly with the radical chain ends, with temporary formation of an alkoxyamine group at the chain end. Customary polymerization temperatures are in the range of 100-140° C. In comparison to free radical polymerization, the growth rate in the case of NMP is greatly reduced. Depending on the ratio between initiator and monomer that is used, and also on the concentration of the components in the solvent selected, the reaction time until complete conversion is achieved may amount to several days. In order to make the synthesis more economic, the reaction rate can be increased by addition of an accelerator. E. Malmström, R. D. Miller and C. J. Hawker describe, for example, in Tetrahedron, 1997, 53 (45), 15225-15236, the capacity of acetic anhydride to acetylate the amine function in the alkoxyamine, thereby weakening the C—O bond. It has been possible in this way to reduce the reaction time from 48 h to 4 h. H. Jianying, L. Jian, L. Minghua, L. Qiang, D. Lizong, Z. Yousi, in J. Polym. Sci. A Polym. Chem. 2005, 43, 5246-5256, describe the activity of other accelerating additives such as, for example, trifluoroacetic anhydride, acetylacetone, ethyl acetoacetate, diethyl malonate, or malononitrile.

To generate polymers with a defined molecular weight and narrow molecular weight distribution, unimolecular initiation has proved appropriate. Here, the initiator used comprises an alkoxyamine which on increase in temperature undergoes dissociation to perform a persistent nitroxide radical and an alkyl radical, and so initiates the polymerization.

The polymerization is customarily ended by lowering of the temperature to room temperature. This leaves at the end of the chain an alkoxyamine group which is formed by the recombination of the radical chain end with the persistent nitroxide radical.

A comprehensive description of suitable monomers, nitroxides and polymerization processes, and also in relation to kinetic aspects and appropriate methods of characterization, can be found in the review article by J. Nicolas, Y. Guillaneuf, C. Lefay, D. Bertin, D. Gigmes, B. Charleux in Progress in Polymer Science 2013, 38, 63-235.

The synthesis of polymers suitable as binders for photoresists by NMP has also already been described. U.S. Pat. No. 6,107,425 describes the radical polymerization of protected 4-hydroxystyrene, such as, for example, 4-acetoxystyrene, in the presence of a persistent nitroxide radical. Also described there is the unimolecular initiation with an alkoxyamine. The polymerization is ended by lowering of the temperature to room temperature. The desired poly(4-hydroxystrene) and/or copolymers thereof are obtained by polymer-analogous reaction.

The NMP of 4-hydroxystyrene derivatives is also described in numerous scientific publications, such as, for example:

Generation of organic/inorganic hybrid particles: C. Anger, F. Deubel, S. Salzinger, J. Stohrer, T. Halbach, R. Jordan, J. G. C. Veinot, B. Rieger, ACS Macro Lett. 2013, 2, 121-124.

Fundamental studies on the NMP of 4-acetoxystyrene, hydrolysis to poly(4-hydroxystyrene), investigation of the molecular weight-dependent solubility behaviour: G. G. Barclay, C. J. Hawker, H. Ito, A. Orellana, P. R. L. Malenfant, R. F. Sinta Macromolecules 1998, 31, 1024-1031.

New generation of nitroxides for polymerization of, among others, 4-acetoxystyrene and 4-tert-butoxystyrene: J. Areephong, K. M. Mattson, N. J. Treat, S. O. Poelma, J. W. Kramer, H. A. Sprafke, A. A. Latimer, J. Read de Alaniza, C. J. Hawker Polym. Chem. 2016, 7, 370.

Polymerization of variously protected 4-hydroxystyrenes by NMP to give block copolymers, with the aim of generating amphiphilic block copolymers by selective deprotection: M. Messerschmidt, M. Millaruelo, H. Komber, L. Häussler, B. Voit, T. Krause, M. Yin, W.-D. Habicher, Macromolecules 2008, 41, 2821-2831.

In these publications the reactions are brought to an end by lowering of the temperature to room temperature. As a result, the alkoxyamine end group formed by recombination of the radical chain end with the persistent nitroxide radical remains at the chain end. In the course of the subsequent reprocessing of the polymers thus prepared, at temperatures above 100° C., as may occur, for example, in thermoplastic processing operations but also in photolithography, this end group, which continues to be unstable and reactive, may be cleaved again into an alkyl radical at the chain end and a nitroxide radical; as a result, there may be secondary reactions and hence also unwanted follow-on products.

To prevent this reactivation of the polymer chains at higher temperatures, the alkoxyamine groups may be substituted in various ways by inert or other functional groups. H. Malz, H. Komber, D. Voigt, J. Pionteck Macromol. Chem. Phys. 1998, 199,583-588, for example, describe the possibility of substituting the alkoxyamine end groups of polystyrene synthesized by NMP by a hydrogen atom, an alcohol group or a carbonyl function, for example, by renewed heating in the presence of various substances. The introduction of further functional groups through the heating of alkoxyamine-terminated polystyrenes in the presence of various reagents is described by Y. Guillaneuf, P.-E. Dufils, L. Autissier, M. Rollet, D Gigmes and D. Bertin in Macromolecules 2010, 43, 91-100. Substitution of the alkoxyamine end group is also described for protected poly(4-hydroxystrene derivatives) and copolymers. In EP 1572751 B1, for example, heating of an NMP-prepared protected poly(4-hydroxystrene) in the presence of a halosilane is described as both removing the protecting groups of the hydroxystyrene units and substituting the alkoxyamine end groups by an inert group. In these and numerous further examples, the protecting group is substituted by an inert group, by reheating the polymer after the polymerization with the corresponding agent. A decisive disadvantage of this for industrial use is that an additional operating step with further purification procedures is necessary. To solve the problem, L. Petton, A. E. Ciolino, B. Dervaux and F E. Du Prez propose in Polym. Chem., 2012, 3, 1867-1878 that the substitution agent should be added, after the desired conversion, directly to the reaction mixture, and that stirring should continue at the polymerization temperature until all of the end groups are substituted. Substitution agents used here are dodecanethiol, thiophenol, benzoyl peroxide (BPO), azobis(isobutyronitrile) (AIBN) and tetrabromomethane. A disadvantage of all of the substitution agents stated here is that they can initiate new polymer chains if there is still residual monomer in the mixture when the substitution agent is added. There would be a critical advantage here in using a compound which, after giving up a hydrogen radical, is unable to initiate new chains.

It was an object of the present invention, therefore, to provide a process for preparing polymers, especially homo- and copolymers of 4-hydroxystrene with a narrow molecular weight distribution, by means of nitroxyl-controlled polymerization, that does not have the disadvantages indicated above, thus being largely free from secondary reactions and unwanted formation of oligomers during the polymerization and the end-group substitution, while at the same time allowing the possibility of an accelerated and therefore economic production process. In accordance with the invention, moreover, an intention is to provide a process wherein the formation of secondary products or impurities can be minimized or prevented.

This object is achieved by the process and the polymer both described herein, and the advantageous developments thereof.

The invention therefore relates to a process for preparing a polymer by nitroxyl-controlled polymerization, comprising the following steps:

a) providing a mixture susceptible to radical polymerization and comprising or consisting of
  i) at least one monomer A1 polymerizable by radical polymerization, or a monomer mixture comprising or consisting of the at least one monomer A1 and also at least one further monomer A2, capable of radical polymerization and different from the monomer A1, and
  ii) at least one initiator B selected from the group consisting of
    an alkoxyamine B1 which initiates the radical polymerization by cleaving into an alkyl radical and a nitroxyl radical
    and
    an initiator B2 which comprises at least one radical initiator and also at least one nitroxyl radical,
b) initiating the radical polymerization and maintaining the polymerization over a time period which allows polymerization to a conversion of 10 to 100%,
c) adding at least one reactive agent C after a polymerization conversion of between 10% and 100%, in an amount which converts at least a portion or the entirety of the alkoxyamine end groups of the polymer, generated in the nitroxyl-controlled radical polymerization, into a non-polymerizable group, and also d) adding, to one or more of steps a) to c), at least one additive D which accelerates the nitroxyl-controlled polymerization reaction and/or the conversion of the alkoxyamine end groups of the polymer into a non-polymerizable group.

It is immaterial here whether the steps a) and b) are carried out in the order listed here or in reverse order or simultaneously. Step c) takes place preferably after steps a) and b), after a desired conversion (10 to 100%) has been obtained in steps a) and b). With particular preference, step c) is carried out after a conversion of 50 to 100%, more preferably of 75 to 100%, very preferably 90 to 100%, more particularly 95 to 100%.

Step d) may take place before each step a) to c) or simultaneously to them. Step d) more particularly takes place after and/or during step c).

By means of this process it is possible in particular to prepare polyhydroxystyrene homo- and copolymers which have a narrow molecular weight distribution and can be prepared in a comparatively simple and rapid process. Another feature of the process of the invention is that the formation of by-products in the reaction, leading to impurities in the end products, can be suppressed. The polymers prepared in accordance with the invention therefore feature a high purity.

Surprisingly it has been found that adding the accelerator (additive D) first allows acceleration of the polymerization reaction itself and secondly accelerates the elimination of the end groups introduced into the polymer by the reactive agent C. The process of the invention can therefore be performed as a one-pot reaction; the economics of the process regime are significantly enhanced.

Further, it has surprisingly been found that in the case of the accelerated end group substitution, fewer secondary reactions occur, since the products for which end group substitution is carried out in an accelerated form are largely free of by-products.

In particular, all of steps a) to d) are performed in a one-pot reaction. This allows the simplicity and economics of the synthesis process of the invention to be further boosted and at the same time allows the cost and complexity of apparatus to be minimized.

Surprisingly it has been found in this context that the combination of accelerated polymerization and end group substitution in situ in the context of a one-pot reaction leads to polymers which, after removal of the protecting groups to form polyhydroxystyrene homo- and copolymers, exhibit improved temperature stability.

The polymer is able accordingly to fulfil the present object of specifying a process for the synthesis of PHS-containing polymers that allow narrow molecular weight distribution and an elevated temperature stability in an economical operation. This object has been achieved in accordance with the invention by generating the polymer by NMP in the presence of an accelerator and, after the desired conversion, replacing the alkoxyamine end groups of the polymer chains by inert groups, with the accelerator still being present during the substitution reaction, so that the end group substitution as well proceeds in an accelerated manner. This substitution reaction may be performed, for example, together with the prior polymerization, as a one-pot reaction. In that case the end group substitution as well proceeds in an accelerated manner if the accelerator is added only after the polymerization, in other words before or at the same time as the addition of the reactive agent C.

In one preferred embodiment the at least one monomer A1 is selected from the group of hydroxystyrene monomers whose hydroxyl group is protected with a protecting group which is inert under the conditions of the radical polymerization, and/or the monomer mixture comprises or consists of at least one hydroxystyrene monomer A1 and also at least one further monomer A2 which is capable of radical polymerization and is different from the hydroxystyrene monomer A1.

With particular preference the hydroxystyrene monomer (monomer A1) is selected from the group consisting of alkoxy-, aryloxy-, acyloxy-, silyloxy-, carbamyloxy- or sulfonyloxy-substituted hydroxystyrenes, more particularly 4-acetoxystyrene, 4-tert-butoxystyrene, 4-trimethylsilyloxystyrene, 4-tert-butyldimethylsilyloxystyrene, 4-triethylsilyloxystyrene, 4-triisopropyl-silyloxy-styrene, 4-methoxystyrene, 4-methoxymethoxystyrene, 4-benzoxystyrene, 4-p-methoxybenzoxystyrene, 4-benzyloxymethoxystyrene, 4-tert-butyloxycarbonyloxystyrene, 4-triphenylmethyloxystyrene, 4-pivaloyloxystyrene, 4-benzoyloxystyrene, 4-p-toluenesulfonyloxystyrene, and 4-methylsulfonyloxystyrene, and also mixtures and combinations thereof.

The additive D which accelerates the polymerization reaction is preferably added in step a), step b) and/or step c).

In particular the at least one additive D is selected from the group consisting of carboxylic acid derivatives and ketones and also combinations.

The carboxylic acid derivatives in this context are preferably selected from the group consisting of carboxylic anhydrides, carboxylic esters and carbonitriles, more particularly acetic anhydride, trifluoroacetic anhydride, ethyl acetoacetate, diethylmalonate and/or malononitrile; the ketone more particularly is acetylacetone.

The at least one additive is preferably used in an amount of 5 to 600 mol %, preferably 20 to 200 mol %, more preferably 100 to 150 mol %, based on the amount of initiator B.

The further additional monomer A2, which may be present in the monomer mixture additionally to the monomer A1, is preferably selected from the group consisting of styrenes, isoprene, butadiene and acrylates, more particularly acrylates having the following formula

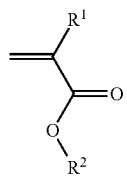

where in each case independently of one another
$R^1$ is hydrogen or an alkyl group, more particularly a methyl group, and
$R^2$ is a methyl, ethyl, n-propyl, isopropyl, n-butyl, isobutyl, tert-butyl, t-amyl, benzyl, cyclohexyl, 9-anthracenyl, 2-hydroxyethyl, 3-phenyl-2-propenyl, adamantyl, methyladamantyl, ethyladamantyl, isobornyl, 2-ethoxyethyl, n-heptyl, n-hexyl, 2-hydroxypropyl, 2-ethylbutyl, 2-methoxypropyl, 2-(2-methoxyethoxy), 2-naphthyl, 2-phenylethyl, phenyl, lauryl, myristyl, cetyl, stearyl, ceryl, isodecyl, 2-ethylhexyl, ethyltriglycol, tetrahydrofurfuryl, butyldiglycol, 2-dimethylaminoethyl, polyethylene glycol, methylpolyethylene glycol or glycidyl group.

In the event that a monomer mixture composed of the monomer A1, more particularly the hydroxystyrene monomer A1, and a further monomer A2 is used, preferably the molar fraction of the at least one hydroxystyrene monomer A1, based on the entirety of the at least one hydroxystyrene monomer A1 and the at least one further monomer A2 in the monomer mixture, is from 0.1 to 99.9 mol %, preferably from 5 to 95 mol %, more particularly from 20 to 90 mol %.

The at least one alkoxyamine B1 is preferably selected from compounds having the following general formula

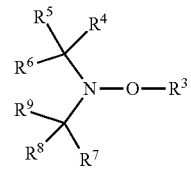

where in each case independently of one another
$R^3$ is a group having at least one carbon atom which is in a position to enter into homolytic cleavage of the bond between oxygen atom and residue $R^3$ and to form a radical $.R^3$, the residue $R^3$ being selected more particularly from the group consisting of 1-phenylethyl, tert-butyl, cyanoisopropyl, phenyl, methyl,
$R^4$, $R^5$, $R^7$ and $R^8$ are identical or different and are selected from the group consisting of linear, branched or cyclic and/or unsubstituted or substituted alkyl residues, the residues $R^4$, $R^5$, $R^7$ and $R^8$ more particularly being identical or different and being selected from the group consisting of methyl, ethyl, n-propyl, isopropyl, n-butyl, isobutyl, tert-butyl, neopentyl, benzyl, cyclohexyl, or the moieties $R^4$—C—$R^5$ and/or $R^7$—C—$R^8$, via the radicals $R^4$ and $R^5$ and/or $R^7$ and $R^8$, form a cyclic structure which in turn may be substituted or unsubstituted,
$R^6$ and $R^9$ are identical or different and are selected from the group consisting of linear, branched or cyclic and/or unsubstituted or substituted alkyl residues, or the moiety $R^6$—C—N—C—$R^9$, via the residues $R^6$ and $R^9$, forms a cyclic structure which in turn may be substituted or unsubstituted and/or fused to an aliphatic or aromatic ring system, the cyclic structure being selected more particularly from structures having the following general formulae

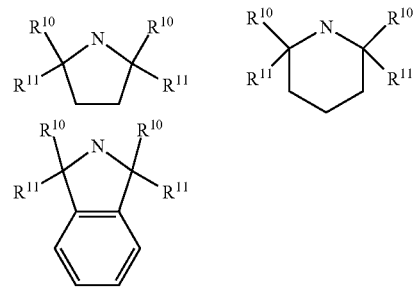

where in each case independently of one another at each occurrence
$R^{10}$ and $R^{11}$ are identical or different and are selected from the group consisting of linear or branched and/or unsubstituted or substituted alkyl residues, more particularly methyl, ethyl, n-propyl, isopropyl, n-butyl, isobutyl, tert-butyl, neopentyl, benzyl, cyclohexyl and hydrogen.

Exemplary alkoxyamines B1, which in particular can also be used for the purposes of the present invention, are described by Nicolas et al. in Progress in Polymer Science 38 (2013) 63-235.

Alternatively or additionally to this, the at least one initiator B2 may be at least one radical initiator which preferably is selected from the group consisting of peroxides; azo compounds, more particularly dibenzoyl peroxide, cumene hydroperoxide, dicumyl peroxide, 1,1-di(tert-butylperoxy)cyclohexane, tert-amyl peroxyacetate, diisopropyl peroxydicarbonate, peroxodisulfates, azobis(isobutyronitrile); redox systems and photoinitiators, and at least one nitroxyl radical selected from the group consisting of nitroxyl radicals having the following general formula

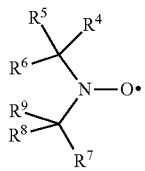

where in each case independently of one another
$R^4$, $R^5$, $R^7$ and $R^8$ are identical or different and are selected from the group consisting of linear, branched or cyclic and/or unsubstituted or substituted alkyl residues, the residues $R^4$, $R^5$, $R^7$ and $R^8$ more particularly being identical or different and being selected from the group consisting of methyl, ethyl, n-propyl, isopropyl, n-butyl, isobutyl, tert-butyl, neopentyl, benzyl, cyclohexyl, or the moieties $R^4$—C—$R^5$ and/or $R^7$—C—$R^8$, via the radicals $R^4$ and $R^5$ and/or $R^7$ and $R^8$, form a cyclic structure which in turn may be substituted or unsubstituted,
$R^6$ and $R^9$ are identical or different and are selected from the group consisting of linear, branched or cyclic and/or unsubstituted or substituted alkyl residues, or the moiety $R^6$—C—N—C—$R^9$, via the residues $R^6$ and $R^9$, forms a cyclic structure which in turn may be substituted or unsubstituted and/or fused to an aliphatic or aromatic ring system, the cyclic structure being selected more particularly from structures having the following general formulae

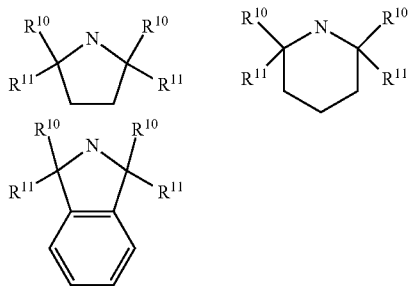

where in each case independently of one another at each occurrence
$R^{10}$ and $R^{11}$ are identical or different and are selected from the group consisting of linear or branched and/or unsubstituted or substituted alkyl residues, more particularly methyl, ethyl, n-propyl, isopropyl, n-butyl, isobutyl, tert-butyl, neopentyl, benzyl, cyclohexyl and hydrogen.

Exemplary initiators B2, which in particular can also be used for the purposes of the present invention, derive from the alkoxyamines described by Nicolas et al. in Progress in Polymer Science 38 (2013) 63-235.

Based on the total amount of substance of monomer A1 or, in the case of a monomer mixture, monomers A1 and A2, the initiator B is used preferably in an amount of 0.1 to 20 mol %, more preferably in an amount of 0.2 to 10 mol % and very preferably in an amount of 1 to 5 mol %.

The at least one reactive agent C is preferably selected from the group consisting of substituted phenols, more particularly 2,6-di-tert-butyl-p-cresol, octadecyl 3-(3,5-di-tert-butyl-4-hydroxyphenyl)propionate, 2,6-di-tert-butylphenol, hydroquinone; and non-homopolymerizable monomers, more particular maleic anhydride or isobutyl vinyl ether.

In particular it is advantageous if the at least one reactive agent C is used in an amount of 10 to 1000 mol %, preferably of 90 to 200 mol % and very preferably of 100 to 150 mol %, based on the concentration of initiator B.

The mixture used for the radical polymerization preferably comprises a solvent which in particular is selected from the group consisting of PGMEA, ethyl acetate, toluene, xylene, ethylbenzene, anisole, acetone, 2-butanone, acetonitrile, dimethyl sulfoxide, tetrahydrofuran, dioxane, diethyl ether, tert-butyl methyl ether, pentane, hexane, heptane, cyclopentane, cyclohexane, methanol, ethanol, n-propanol, isopropanol, n-butanol, tert-butanol, ethylene glycol, propylene glycol, diethylene glycol, ethylene glycol monomethyl ether, ethylene glycol dimethyl ether, diethylene glycol monomethyl ether, diethylene glycol dimethyl ether, diethylene glycol monobutyl ether and also mixtures and combinations thereof.

The polymerization reaction may be initiated thermally or actinically.

For initiating the polymerization and/or for maintaining the polymerization reaction, it is preferred to adjust a temperature of 60 to 180° C., preferably 90 to 140° C., more preferably 100 to 130° C. The aforesaid temperature is used in particular for initiating the reaction and is maintained throughout the duration of the reaction.

It is further advantageous if after the conclusion of step c), the protecting group of the hydroxystyrene monomer A1 bonded in the polymer is eliminated.

The present invention also relates to a polymer which is preparable by a process of the invention as described above.

The polymer is notable in particular for the following features:
a preferred average degree of polymerization P in the range between 5 and 1000, more preferably in the range between 10 and 500, very preferably in the range between 20 and 100,
a molecular weight distribution with polydispersity index (PDI) of 1.01 to 1.50,
the presence of a characteristic end group which corresponds to the non-polymerizable group generated in step c) of the process, more particularly hydrogen.

The average degree of polymerization may be determined, for example, by taking the number-average molecular weight—obtained from a standard method for molecular weight determination, such as size exclusion chromatography, for example—and dividing it by, in the case of a homopolymer of the monomer A1, the molar mass of the monomer A1, or, in the case of the copolymer of two or more monomers, dividing it by a molar mass averaged from all the molar masses of the monomers used, according to the following equation:

$$\overline{M_g} = \Sigma x_i M_i$$

$\overline{M_g}$ here is the molar mass averaged from all the molar masses of the monomers used, $x_i$ is the mole fraction of the monomer i incorporated in the polymer, and $M_i$ is the molar mass of the monomer i incorporated in the polymer.

The PDI is determined by gel permeation chromatography (GPC), by determining the values for Mw and Mn from the elugram after calibration of the method (either with corresponding standards or with light scattering). Dividing Mw by Mn gives the PDI.

For determining the number-average (Mn) and the weight-average molecular weight (Mw), preference is given to eluting a solution of the polymer in tetrahydrofuran (2 mg/ml) with tetrahydrofuran through a GPC column set from Polymer Standards Service GmbH (Mainz) consisting of the SDV 1000, SDV 100 000 and SDV 1000 000 types. The elution time is determined using a UV detector. By means of a calibration of the method carried out beforehand using polystyrene standards, and by evaluation using the PSS WinGPC Unity software (Polymer Standards Service GmbH, Mainz), the values for the number-average and weight-average molecular weights and also for the polydispersity index are determined from the signal intensity of the UV detector, which is dependent on the elution volume.

There is preferably a characteristic starting group present which corresponds to the group $R^3$ in the general formulae described above in connection with the initiators. More particularly this group is hydrogen.

With further advantage the polymer is characterized in that its molecular weight is maintained unchanged by heating to a temperature of between 100° C. and 130° C. for a time period of between 15 minutes and 180 minutes.

In principle the polymers prepared by the process of the invention may be employed as moulding compounds for all possible plastics applications.

In principle the process has advantages where the requirements are for polymers with narrow molecular weight distribution or with specific polymer architecture (e.g. block copolymers, star polymers). Narrow molecular weight distributions are needed, for example, in the case of binders in photoresists, encapsulation of active ingredients for their defined release, with hotmelt adhesives or calibration standards. Applications for specific polymer architectures are thermoplastic elastomers, surfactants and/or dispersants, foam stabilizers or phase mediators for polymer blends.

The most important industrial application for polyhydroxystyrene of narrow molecular weight distribution is the use thereof as a binder in photoresists.

Other applications for poly(4-hydroxystrene) are use as a coating such as, for example, as an adhesion promoter (in hotmelts, for example), as a film or foil, and also as an additive in plastics, such as, for example, as an antioxidant or flame retardant in plastics applications. In these applications, however, the demands in terms of the molecular weight and the molecular weight distribution are not so high. Furthermore, these products are sold at a substantially more favourable price than binders for photoresists, and so products produced by the method described here would not be competitive.

Another preferred application of the hydroxystyrenes of the invention are polymer materials which are employed for generative fabrication (additive manufacturing) methods, such as 3D printing, for example.

Depending on their intended use, additives may be added to the polyhydroxystyrenes of the invention in order to achieve particular desired qualities in processing operations.

These adjuvants are selected more particularly from the group consisting of UV absorbers, photostabilizers, stabilizers, hydroxylamines, benzofuranones, metal deactivators, filler deactivators, flame retardants, impact tougheners, adhesion promoters, plasticizers, lubricants, rheology modifiers, processing assistants, flow control agents, pigments, dyes, fillers, reinforcers, optical brighteners, active antimicrobial ingredients, antistats, slip agents, anti-blocking agents, coupling agents, dispersants, compatibilizers, oxygen scavengers, acid scavengers, tagging agents, anti-fogging agents, and also mixtures and combinations of at least two of the aforesaid adjuvants.

For application as a coating or film, preference is given to using additives from the group of UV absorbers, photoprotectants, stabilizers, plasticizers, flow control agents, lubricants, optical brighteners, dyes and/or pigments.

Suitable light stabilizers and UV stabilizers are, for example, compounds based on benzotriazoles, benzophenones, hydroxyphenyltriazines, oxamides or sterically hindered amines known as HALS compounds. Suitable stabilizers are, in particular, phenolic antioxidants, phosphites, phosphonites, hydroxylamines, N-oxides (nitrones), thioethers or disulfides.

Suitable plasticizers are, for example, long-chain esters of phthalic acid, of adipic acid or of sebacic acid.

Suitable flow control agents are, for example, fluorine-modified polyacrylates or silicone-modified acrylates.

Suitable lubricants are, for example, waxes such as montan waxes or salts of long-chain fatty acids such as calcium stearate or zinc stearate.

Optical brighteners are, for example, bisbenzoxazoles, phenylcumarins or bis(styryl)biphenyls.

Suitable dyes and pigments may be of inorganic or organic nature. Suitable inorganic pigments are, for example, titanium dioxide, zinc oxide, zinc sulfide, iron oxide, ultramarine and carbon black. Suitable organic pigments and dyes are, for example, anthraquinones, anthanthrones, benzimidazolones, quinacridones, quinophthalones, diketopyrrolopyrroles, dioxazines, flavanthrones, indanthrones, isoindolines, isoindolinones, azo compounds, naphthols, perinones, perylenes, phthalocyanines or pyranthrones. Further suitable pigments are metal-based effect pigments or metal oxide-based pearlescent pigments.

Photoresists based on the hydroxystyrenes of the invention comprise preferably a solvent, a (photo)sensitizer or acid generator and a flow control agent.

The present invention is elucidated in more detail with reference to the statements hereinafter, without limiting the invention to the specifically represented subject matter.

Monomers used are 4-hydroxystyrene derivatives whose OH group carries a protecting group. It is possible optionally for comonomers to be used. In the working examples described below, 4-acetoxystyrene is homopolymerized or copolymerized with styrene. The polymerization process used is that of nitroxyl-controlled radical polymerization. Initiation in this case takes place unimolecularly with an alkoxyamine, which in the examples shown here is (2,2,6,6-tetramethyl-1-(1-phenylethoxy)piperidine (EBTEMPO), the adduct of ethylbenzene and 2,2,6,6-tetramethylpiperidin N-oxide (TEMPO).

This polymerization is carried out in the presence of acetic anhydride as accelerator. The effect of this, as described in the literature, is to accelerate the polymerization and also, in accordance with the invention, the end group substitution reaction. After the desired conversion, for the purpose of terminating the polymerization and of substituting an inert group for the alkoxyamine end groups, an agent is added which is reactive towards the radical chain end and which, following transfer of the inert group onto the radical chain end, is not in a position to initiate a new polymerization. Phenol derivatives have proved suitable for this purpose. In the working examples, 2,6-di-tert-butyl-p-cresol (BHT) has been used for this purpose. The end group substitution here is carried out in a one-pot reaction in the polymerization mixture.

COMPARATIVE EXAMPLE 1. POLYMERIZATION WITHOUT END GROUP SUBSTITUTION AND SUBSEQUENT HYDROLYSIS

In this comparative example, 4-acetoxystyrene was copolymerized with styrene by NMP and the resultant polymer was hydrolysed to poly(4-hydroxystrene-co-styrene) without prior substitution of the end groups capable of polymerization. The polymerization reaction for this purpose was discontinued by lowering of the temperature to room temperature. The determination of the molecular weights and their distributions before and after the hydrolysis demonstrates that the hydrolysis increased the breadth of the molecular weight distribution.

a) Polymerization

A 2 L jacketed reactor with stirrer, dropping funnel and nitrogen feed line is charged with 750 mL (4.36 mol) of destabilized 4-acetoxystyrene and 166 mL (1.45 mol) of styrene. 72.4 g (0.28 mol) of EBTEMPO, 100 mL of methoxy-2-propyl acetate (PGMEA) and 79 mL (0.83 mol) of acetic anhydride are dissolved in 100 mL of the monomer mixture, degassed by introduction of nitrogen and introduced into the dropping funnel. The rest of the monomer mixture is likewise degassed by introduction of nitrogen. After heating of the monomer mixture to 130° C., the initiator mixture is placed into the reactor and stirring takes at 130° C. for 6 hours. In the course of cooling to room temperature, the mixture is diluted with 1 L of toluene and, when room temperature is reached, the polymer is precipitated from 12 L of a mixture of methanol and water (5:1). The polymer is filtered and dried to constant weight under reduced pressure at 60° C.

b) Hydrolysis 15 g of poly(4-acetoxystyrene-co-styrene) from a) are dispersed in 150 mL of methanol and degassed by introduction of nitrogen. The mixture is admixed with 1.05 mL of methanesulfonic acid and stirred at room temperature and under nitrogen overnight, the polymer going into solution in the course of the reaction. The product is subsequently precipitated from water and isolated by filtration. The residue is dissolved in ethyl acetate and extracted twice with water. A final precipitation from hexane isolates the polymer.

c) Characterization

The molecular weight distributions of the copolymers prepared in a) and b) were investigated by size exclusion chromatography (GPC) (Tab. 1).

TABLE 1

Number-average and weight-average molecular weights and polydispersities of the polymers prepared in comparative example 1a) and 1b), measured by GPC (polystyrene calibration).

| Polymer | Mn [kDa] | Mw [kDa] | PDI |
|---|---|---|---|
| before hydrolysis (poly(4-acetoxystyrene-co-styrene) from comparative example 1a)) | 1.99 | 2.54 | 1.28 |
| after hydrolysis (poly(4-hydroxystyrene-co-styrene) from comparative example 1b)) | 1.68 | 2.43 | 1.45 |

From Tab. 1 it is apparent that the average molecular weights after the hydrolysis are lower than before. This is because the molar mass becomes lower as a result of elimination of the acetate groups. It is additionally evident in Tab. 1 that after the hydrolysis, the breadth of the molecular weight distribution increases significantly (polydispersity index before hydrolysis=1.28; after hydrolysis=1.45), this being attributable to the fact that during the hydrolysis, the alkoxyamine end groups enter into secondary reactions which lead to products of coupling of the polymer chains with one another, with a higher molecular weight, this being undesirable for possible use as binders in photoresists.

INVENTIVE EXAMPLE 1: ACCELERATED END GROUP SUBSTITUTION AND SUBSEQUENT HYDROLYSIS

In a first inventive example, the alkoxyamine end groups capable of polymerization from the poly(4-acetoxystyrene-co-styrene) prepared in comparative example 1a) were replaced by a hydrogen atom in the presence of a polymerization-accelerating additive. The end group-substituted polymer was subsequently hydrolysed to poly(4-hydroxystrene-co-styrene). The determination of the molecular weights and their distributions before and after the hydrolysis demonstrates that the breadth of the molecular weight distribution was not altered by the hydrolysis.

a) End Group Substitution 20 g of the polymer prepared in comparative example 1a) are dissolved in 40 mL of PGMEA with 2.6 g (0.016 mol) of BHT and 2.27 g (0.022 mol) of acetic anhydride. The solution is degassed by introduction of nitrogen. The reaction mixture is stirred at 130° C. for 2 hours, during which the solution takes on an orange-red coloration indicating the release of the TEMPO. After cooling to room temperature, the polymer is precipitated from hexane and isolated by filtration.

b) Hydrolysis 15 g of poly(4-acetoxystyrene-co-styrene) from inventive example a) are dispersed in 150 mL of methanol and degassed by introduction of nitrogen. The mixture is admixed with 1.05 mL of methanesulfonic acid and stirred at room temperature and under nitrogen overnight, the polymer going into solution in the course of the reaction. The product is subsequently precipitated from water and isolated by filtration. The residue is dissolved in ethyl acetate and extracted twice with water. A final precipitation from hexane isolates the polymer.

c) Characterization

The molecular weight distributions of the copolymers prepared in a) and b) were investigated by size exclusion chromatography (GPC) (Tab. 2).

TABLE 2

Number-average and weight-average molecular weights and polydispersities of the polymers prepared in inventive example 1a) and 1b), measured by GPC (polystyrene calibration).

| Polymer | Mn [kDa] | Mw [kDa] | PDI |
|---|---|---|---|
| before hydrolysis (poly(4-acetoxystyrene-co-styrene) from inventive example 1a)) | 2.11 | 2.62 | 1.24 |
| after hydrolysis (poly(4-hydroxystyrene-co-styrene) from inventive example 1b)) | 1.77 | 2.21 | 1.25 |

From Tab. 2 it is apparent that—as already observed in comparative example 1—the average molecular weights after the hydrolysis are lower than before. In contrast to comparative example 1, the broadening of the distribution observed after the hydrolysis is no more than negligible, within the range of measurement inaccuracy.

COMPARATIVE EXAMPLE 2. UNACCELERATED END GROUP SUBSTITUTION

In a second comparative example, 4-acetoxystyrene and styrene were again copolymerized by NMP. To remove the accelerator present in the polymerization, the polymer was isolated by precipitation. Subsequently, in a downstream step, the alkoxyamine end groups capable of polymerization were substituted by a hydrogen atom. In contrast to inventive example 1, no polymerization-accelerating additive was added to the substitution reaction in this comparative example. The progress of the substitution reaction was determined by NMR spectroscopy.

a) Polymerization

A 2 L jacketed reactor with stirrer, dropping funnel and nitrogen feed line is charged with 750 mL (4.36 mol) of destabilized 4-acetoxystyrene and 125 mL (1.09 mol) of styrene. 71.27 g (0.27 mol) of EBTEMPO, 100 mL of methoxy-2-propyl acetate (PGMEA) and 77 mL (0.82 mol) of acetic anhydride are dissolved in 100 mL of the monomer mixture, degassed by introduction of nitrogen and introduced into the dropping funnel. The rest of the monomer mixture is likewise degassed by introduction of nitrogen. After heating of the monomer mixture to 130° C., the initiator mixture is placed into the reactor and stirring takes at 130° C. for 6 hours. In the course of cooling to room temperature, the mixture is diluted with 1 L of toluene and, when room temperature is reached, the polymer is precipitated from 12 L of a mixture of methanol and water (5:1). The polymer is filtered and dried to constant weight under reduced pressure at 60° C.

b) End Group Substitution 5 g of the polymer obtained in a) are dissolved in 10 mL of PGMEA. 2 equivalents of BHT are added and the reaction mixture is degassed by introduction of nitrogen. The reaction mixture is subsequently heated with stirring at 130° C. for 6 hours. An orange-red coloration of the reaction mixture here indicates the release of the persistent TEMPO radical. After 2 hours, a sample of the mixture is taken for determining the fraction of alkoxyamine end groups that have remained. The polymer is isolated by precipitation from hexane.

c) Characterization

The substitution of the alkoxyamine group is investigated by $^1$H NMR spectroscopy. The percentage fractions of end groups determined, based on the number of polymer chains, are listed in Tab. 3.

TABLE 3

Percentage fractions of alkoxyamine end groups (based on number of polymer chains) of the polymer resulting from comparative example 2: during end group substitution with and without acceleration after 2 h and 6 h reaction time

|  | after 2 h reaction time | after 6 h reaction time |
|---|---|---|
| Percentage fractions of alkoxyamine end groups in the polymer in the case of end group substitution without acceleration (comparative example 2) | 47% | 2% |

From Tab. 3 it is apparent that the end groups in the case of the unaccelerated substitution reaction are still 47% after 2 hours, and even after 6 hours of reaction time there are still 2% of the alkoxyamine end groups remaining in the polymer. Moreover, in the $^1$H NMR spectrum of the polymer, there were signals evident in the range between 1.3 and 1.5 ppm which were not assignable to the desired polymer (otherwise unidentifiable impurities).

INVENTIVE EXAMPLE 2. DEMONSTRATION OF ACCELERATED END GROUP SUBSTITUTION

In a second inventive example it is demonstrated that the addition of an accelerator accelerates not only the polymerization but also the end group substitution. Additionally it is demonstrated that through the acceleration of the end group substitution it is possible to reduce the formation of secondary reactions. In order to visualize this effect, the 4-acetoxystyrene from comparative example 2a) was used as starting material. The alkoxyamine end groups capable of polymerization in this material were substituted by a hydrogen atom in a downstream step. To accelerate the substitution reaction, acetic anhydride was added. The progress of the substitution reaction was determined by NMR spectroscopy.

a) End Group Substitution 5 g of the polymer obtained in comparative example 2a) are dissolved in 10 mL of PGMEA. 2 equivalents of BHT and also 3 equivalents of acetic anhydride, based on the initiator concentration, are added and the reaction mixture is degassed by introduction of nitrogen. The reaction mixture is subsequently heated with stirring at 130° C. After 2 hours the reaction mixture is cooled to room temperature. An orange-red coloration of the reaction mixture here indicates the release of the persistent TEMPO radical. The polymer is isolated by precipitation from hexane.

b) Characterization

The substitution of the alkoxyamine group is investigated by $^1$H NMR spectroscopy. The percentage fractions of end groups determined, based on the number of polymer chains, are listed in Tab. 4.

TABLE 4

Percentage fractions of alkoxyamine end groups (based on number of polymer chains) of the polymer resulting from inventive example 2a) after 2 h and 6 h reaction time

|  | after 2 h reaction time | after 6 h reaction time |
|---|---|---|
| Percentage fractions of alkoxyamine end groups in the polymer in the case of end group substitution with acceleration (inventive example 2) | 0% | — |

From Tab. 4 it is apparent that the end groups in the case of the accelerated substitution were removed quantitatively after just 2 hours. Moreover, in the $^1$H NMR spectrum of the polymer, there were no signals apparent in the range between 1.3 and 1.5 ppm that could not be assigned to the desired polymer

INVENTIVE EXAMPLE 3: DEMONSTRATION OF THE IMPROVED TEMPERATURE STABILITY WITH END GROUP SUBSTITUTION AS ONE-POT REACTION

A second inventive example illustrates the advantageous nature of carrying out the end group substitution in a one-pot reaction. For this purpose, a further polymer was prepared by the same process as in the examples described above, with the difference that here the end group substitution was carried out as a one-pot reaction, with the polymerization-accelerating agent still being present during the end group substitution as well. This polymer too was hydrolysed as described in comparative example 1b) and inventive example 1b). As a further characterization step, a temperature stability test was added here.

a) Polymerization and End Group Substitution

A 2 L jacketed reactor with stirrer, dropping funnel and nitrogen feed line is charged with 750 mL (4.36 mol) of destabilized 4-acetoxystyrene and 166 mL (1.45 mol) of styrene. 72.4 g (0.28 mol) of EBTEMPO, 100 mL of methoxy-2-propyl acetate (PGMEA) and 79 mL (0.83 mol) of acetic anhydride are dissolved in 100 mL of the monomer mixture, degassed by introduction of nitrogen and introduced into the dropping funnel. The rest of the monomer mixture is likewise degassed by introduction of nitrogen. After heating of the monomer mixture to 130° C., the initiator mixture is placed into the reactor and stirring takes at 130° C. for 6 hours. After 6 hours, the reaction mixture is admixed with 102 g (0.46 mol) of BHT in solution in 100 mL of PGMEA. After a further 2 hours of stirring at 130° C., cooling takes place to room temperature. In the course of cooling to room temperature, the mixture is diluted with 1 L of toluene and, when room temperature is reached, the polymer is precipitated from 12 L of a mixture of methanol and water (5:1). The polymer is filtered and dried to constant weight under reduced pressure at 60° C.

b) Hydrolysis 15 g of the poly(4-acetoxystyrene-co-styrene) prepared in a) are dispersed in 150 mL of methanol and degassed by introduction of nitrogen. The mixture is admixed with 1.05 mL of methanesulfonic acid and stirred at room temperature and under nitrogen overnight, the polymer going into solution in the course of the reaction. The product is subsequently precipitated from water and isolated by filtration. The residue is dissolved in ethyl acetate and extracted twice with water.

A final precipitation from hexane isolates the polymer.

c) Temperature Stability Test

Investigated comparatively in this test are the polymer from b) and also the polymer from inventive example 1b) after separate end group substitution. For this test, the polymers in solid form are heated in an oven at 130° C. under an air atmosphere for 3 hours. After cooling to room temperature, both samples have their molecular weight distributions determined by GPC and compared with those before the temperature stability test.

TABLE 5

Change in the molecular weight distribution of 4-hydroxystyrene-styrene copolymers by heating at 130° C. for 3 h, measured by GPC (polystyrene calibration) as a function of the method of end group substitution.

| Method of end group substitution | Molecular weight distribution after heating at 130° C. for 3 hours |
|---|---|
| subsequently substituted (inventive example 1b)) | shoulder in the region between 4000 g/mol and 9000 g/mol |
| substituted in situ (inventive example 3b)) | no change |

From Tab. 5 it is apparent that in the case of the sample wherein the end groups were substituted in an operating step downstream of the polymerization, the subsequent heating at 130° C. for 3 hours to test the temperature stability produces a high molecular mass fraction which is distinct as a shoulder between 4000 g/mol and 9000 g/mol. In the case of the sample for which the end group substitution was carried out as a one-pot reaction, this shoulder is not in evidence. This means that apparently before or during the end group substitution as a downstream operation, secondary reactions occur to form species which give rise to a molecular weight broadening only in a subsequent temperature stability test. These secondary reactions may occur, for example, during the cooling of the polymerization mixture, if radicals are still formed intermediately by dissociation of the alkoxyamine end groups, but these radicals find no monomer to react with.

INVENTIVE EXAMPLE 4: DEMONSTRATION OF THE ACCELERATED END GROUP SUBSTITUTION AND OF THE RESULTANT IMPROVED TEMPERATURE STABILITY IN A ONE-POT REACTION

In the fourth inventive example it is shown that in a one-pot reaction as well, the substitution of the end groups capable of polymerization proceeds more quickly in the presence of a polymerization-accelerating additive than in its absence. Additionally it is demonstrated that the resultant end products have an improved temperature stability relative to those whose end groups have been substituted without acceleration in a one-pot reaction. In order to be able to carry out unaccelerated end group substitution, it was necessary to carry out the polymerization itself without an accelerating additive, and hence in this example the polymerization time was longer than in the examples shown above. For this purpose, a copolymerization of 4-hydroxystyrene and styrene was carried out without addition of an accelerator, and the reaction mixture was divided into two fractions following complete conversion of the monomers. Added to the first fraction at reaction temperature was an accelerating additive and also an additive which replaces the polymerizable end groups by hydrogen atoms. Added to the second fraction was only the additive that replaces the polymerizable end groups by hydrogen atoms. Both fractions were subsequently hydrolysed to the poly-4-hydroxystrene copolymers and subjected lastly to a temperature stability test.

a) Polymerization

A 50 mL round-bottomed flask with magnetic stirring rod, septum and nitrogen feed line is charged with 15 mL (98.1 mmol) of destabilized 4-acetoxystyrene and 2.2 mL (19.2 mmol) of styrene, 1.209 g (4.69 mmol) of EBTEMPO and 2 mL of methoxy-2-propyl acetate (PGMEA), and this initial charge is degassed by introduction of nitrogen. The flask is placed in an oil bath preheated to 130° C. and the mixture is stirred at 130° C. until monomers are no longer detectable in the $^1$H NMR spectrum of the mixture (after 48 hours). After this time, half of the reaction mixture is removed and is placed under nitrogen into a second round-bottomed flask preheated to 130° C., where it is admixed with 3.2 g of Irganox 1076 (fraction II). The mixture in the original flask (fraction I) is admixed with 1.2 mL (12.7 mmol) of acetic anhydride and also 3.2 g of Irganox 1076. Both reaction mixtures are stirred at 130° C. until reactive end groups are no longer identifiable in the $^1$H NMR spectrum (Tab. 6).

TABLE 6

Percentage fractions of alkoxyamine end groups (based on number of polymer chains) of the polymers originating from inventive example 4a): during end group substitution with and without acceleration after reaction times of 2 h and 7 h

|  | after 2 h reaction time | after 7 h reaction time |
|---|---|---|
| Percentage fractions of alkoxyamine end groups in the polymer with end group substitution with acceleration (fraction I) | 0% | — |
| Percentage fractions of alkoxyamine end groups in the polymer with end group substitution without acceleration (fraction II) | 45% | 0% |

In accordance with the results in Tab. 6, fraction I is cooled to room temperature after 2 hours and fraction II after 7 hours. Both reaction mixtures are diluted with 10 mL each of ethyl acetate and precipitated from n-heptane. The polymers are filtered and dried to constant weight under reduced pressure at 60° C.

a) Hydrolysis 5 g each of the poly(4-acetoxystyrene-co-styrenes) prepared in a) are dispersed in 50 mL of methanol and degassed by introduction of nitrogen. The mixtures are admixed with 0.35 mL of methanesulfonic acid and stirred at room temperature under nitrogen overnight, the polymer going into solution in the course of the reaction. The products are subsequently precipitated from water and isolated by filtration. The residues are dissolved in ethyl acetate and extracted twice with water.

A concluding precipitation from hexane isolates the polymers.

b) Temperature Stability Test

The hydrolysed polymers of fraction I and fraction II are heated as solids in an oven at 130° C. under an air atmosphere for 3 hours. After cooling to room temperature, the number-average molecular weights of both samples are determined by GPC and compared with those before the temperature stability test (Tab. 7).

TABLE 7

Number-average molecular weights of the polymers prepared in inventive example 4 before and after the temperature stability test, measured by GPC (polystyrene calibration).

| Polymer | | Mn [kDa] | Increase |
|---|---|---|---|
| End groups substituted with acceleration (Fraction I from inventive example 4 after hydrolysis) | before heating | 1.89 | |
|  | after heating at 130° C. for 3 h | 2.01 | 6.4% |
| End groups substituted without acceleration (Fraction II from inventive example 4 after hydrolysis) | before heating | 2.27 | |
|  | after heating at 130° C. for 3 h | 2.70 | 18.9% |

From Table 6 it is evident that even in a one-pot reaction, the substitution of the end groups capable of polymerization proceeds more quickly in the presence of a polymerization-accelerating additive than in its absence. In fraction I, which contains an accelerating additive, all of the end groups are substituted after just 2 hours, whereas in fraction II without accelerator this is the case only after 7 hours.

It is additionally evident from Tab. 7 that the end products originating from the accelerated end group substitution have an improved temperature resistance relative to those whose end groups were substituted without acceleration. The number-average molecular weight of the polymer originating from fraction I (with accelerator) increases by only 6% as a result of the temperature stability test, whereas the polymer originating from fraction II (without accelerator) records a molecular weight increase of almost 19% as a result of heating at 130° C. for 3 hours.

INVENTIVE EXAMPLE 5: DEMONSTRATION OF THE IMPROVED TEMPERATURE STABILITY WITH ACCELERATED END GROUP SUBSTITUTION IN A ONE-POT REACTION, IN DIRECT COMPARISON TO AN ACCELERATED AND AN UNACCELERATED END GROUP SUBSTITUTION AFTER PRIOR ISOLATION OF THE POLYMER

In a fifth inventive example it is demonstrated that the conversion of the alkoxyamine end groups into non-polymerizable groups in the presence of a polymerization-accelerating additive, which hence also accelerates the end group substitution, without isolation of the polymer between polymerization and end group substitution, leads to a polymer having improved temperature stability.

For this purpose a copolymerization of 4-hydroxystyrene and styrene was carried out in the presence of an accelerator and the reaction mixture, after complete conversion of the monomers, was divided into three fractions. The first fraction was admixed at reaction temperature with an additive which replaces the polymerizable end groups by hydrogen atoms.

The two other fractions were isolated by precipitation and the end group substitution was carried out in a subsequent step both with and without addition of an accelerator. All three fractions were subsequently hydrolysed to the poly-4-hydroxystrene copolymers and subjected lastly to a temperature stability test.

a) Polymerization

A 50 mL round-bottomed flask with magnet stirring rod, septum and nitrogen feed line is charged with 15 mL (98.1 mmol) of destabilized 4-acetoxystyrene, 2.2 mL (19.2 mmol) of styrene, 1.209 g (4.69 mmol) of EBTEMPO, 1.32 mL (14.0 mmol) of acetic anhydride and 2 mL of methoxy-2-propyl acetate (PGMEA) and this initial charge is degassed by introduction of nitrogen. The flask is placed in an oil bath preheated to 130° C. and the mixture is stirred at 130° C. for 2 hours. After this time, ⅓ of the reaction mixture is removed twice and cooled to room temperature, subjected to precipitation from heptane, filtered and dried (fraction II and fraction III). The fraction in the original flask (fraction I) is admixed with 1.6 g of Irganox 1076 at reaction temperature. After stirring for a further 2 hours at this temperature, the mixture is cooled to room temperature.

The polymers from fraction II and fraction III are each dissolved in 3 mL each of methoxy-2-propyl acetate (PGMEA) in a 50 mL round-bottomed flask with magnetic stirring rod, septum and nitrogen feed line, and 1.6 g of Irganox 1076 is added in each case. Fraction II is additionally admixed with 0.4 mL (4.24 mmol) of acetic anhydride. The dissolved fractions II and III are degassed by introduction of nitrogen, placed in an oil bath preheated to 130° C., and stirred at this temperature until reactive end groups are no longer identifiable in the ¹H NMR spectrum. Fraction II is cooled accordingly after 2 hours and fraction III after 7 hours to room temperature.

All three reaction mixtures (fraction I, II and III) are diluted each with 10 mL of ethyl acetate and precipitated from n-heptane. The polymers are isolated by filtration and dried to constant weight under reduced pressure at 60° C.

a) Hydrolysis 5 g each of the poly(4-acetoxystyrene-co-styrenes) prepared in a) are dispersed in 50 mL of methanol and degassed by introduction of nitrogen. The mixtures are admixed with 0.35 mL of methanesulfonic acid and stirred at room temperature under nitrogen overnight, the polymer going into solution in the course of the reaction. The products are subsequently precipitated from water and isolated by filtration. The residues are dissolved in ethyl acetate and extracted twice with water.

A concluding precipitation from hexane isolates the polymers.

b) Temperature Stability Test

The hydrolysed polymers of fractions I, II and III are heated as solids in an oven at 130° C. under an air atmosphere for 3 hours. After cooling to room temperature, the molecular weight distributions of all samples are determined by GPC and compared with those before the temperature stability test (Tab. 8).

TABLE 8

Polydispersity indices of the polymers prepared in inventive example 5 before and after the temperature stability test, measured by GPC (polystyrene calibration).

| Polymer | | PDI (Mw/Mn) | Increase |
|---|---|---|---|
| End groups substituted with acceleration in a one-pot reaction (Fraction I from inventive example 5 after hydrolysis) | before heating after heating at 130° C. for 3 h | 1.31 1.34 | 2.3% |
| End groups substituted with acceleration after prior isolation (Fraction II from inventive example 5 after hydrolysis) | before heating after heating at 130° C. for 3 h | 1.34 1.44 | 7.5% |
| End groups substituted without acceleration after prior isolation (Fraction III from inventive example 5 after hydrolysis) | before heating after heating at 130° C. for 3 h | 1.29 1.40 | 8.5% |

From table 8 it is apparent that the method of end group substitution has a critical influence on the temperature resistance of the hydrolysed polymers. The breadth of the molecular weight distribution of fraction I, in other words of the polymer whose end groups underwent accelerated substitution in a one-pot reaction, increases by only 2.3% after heating at 130° C. for 3 hours. The breadth of the molecular weight distribution of fraction II, in other words of the polymer whose end groups were subjected to accelerated substitution after prior isolation, increases by 7.5% already after heating at 130° C. for 3 hours. The breadth of the molecular weight distribution of fraction III, in other words of the polymer whose end groups were subjected to unaccelerated substitution after prior isolation, increases indeed by 8.5% after heating at 130° C. for 3 hours. From this it can be inferred that the accelerated end group substitution in a one-pot reaction yields products having the best temperature resistance, but also that the acceleration of end group substitution after prior isolation of the polymers still has a stabilizing effect on the temperature resistance of the polymers.

The invention claimed is:

1. A process for preparing a polymer by nitroxyl-controlled polymerization, comprising the following steps:
   a) providing a mixture susceptible to radical polymerization, comprising:
      i) at least one monomer A1 polymerizable by radical polymerization, or a monomer mixture comprising the at least one monomer A1 and also at least one further monomer A2, capable of radical polymerization and different from the monomer A1, and
      ii) at least one initiator B selected from the group consisting of an alkoxyamine B1 which initiates the radical polymerization by cleaving into an alkyl radical and a nitroxyl radical and an initiator B2 which comprises at least one radical initiator and at least one nitroxyl radical,
   b) initiating the radical polymerization and maintaining the polymerization over a time period which allows polymerization to a conversion of 10 to 100%,
   c) adding at least one reactive agent C after a polymerization conversion of between 10% and 100%, in an amount which converts at least a portion or the entirety of the alkoxyamine end groups of the polymer generated in the nitroxyl-controlled radical polymerization into a non-polymerizable group, wherein the at least one reactive agent C is selected from the group consisting of substituted phenols, hydroxyquinone, and isobutyl vinyl ether, and
   d) adding, to at least step c), at least one additive D which accelerates the nitroxyl-controlled polymerization reaction and/or the conversion of the alkoxyamine end groups of the polymer into a non-polymerizable group, wherein the at least one additive D is selected from the group consisting of carboxylic acid derivatives, ketones and combinations thereof,
   wherein steps a) to d) are performed in a one-pot reaction.

2. The process of claim 1, wherein the at least one monomer A1 is selected from hydroxystyrene monomers whose hydroxyl group is protected with a protecting group which is inert under the conditions of the radical polymerization, and/or
   the monomer mixture comprises at least one hydroxystyrene monomer A1 and at least one further monomer A2 which is capable of radical polymerization and is different from the hydroxystyrene monomer A1.

3. The process of claim 2, wherein the one or more hydroxystyrene monomers are selected from the group consisting of alkoxy-, aryloxy-, acyloxy-, silyloxy-, carbamyloxy- and sulfonyloxy-substituted hydroxystyrenes.

4. The process of claim 2, wherein the one or more hydroxystyrene monomers are selected from the group consisting of 4-acetoxystyrene, 4-tert-butoxystyrene, 4-trimethylsilyloxystyrene, 4-tert-butyldimethylsilyloxystyrene, 4-triethylsilyloxystyrene, 4-triisopropylsilyloxystyrene, 4-methoxystyrene, 4-methoxymethoxystyrene, 4-benzoxystyrene, 4-p-methoxybenzoxystyrene, 4-benzyloxymethoxystyrene, 4-tert-butyloxycarbonyloxystyrene, 4-triphenylmethyloxystyrene, 4-pivaloyloxystyrene, 4-benzoyloxystyrene, 4-p-toluenesulfonyloxystyrene, and 4-methylsulfonyloxystyrene, and combinations thereof.

5. The process of claim 1, wherein the carboxylic acid derivatives are selected from the group consisting of carboxylic anhydrides, carboxylic esters and carbonitriles, and the ketone is acetylacetone.

6. The process of claim 1, wherein the at least one additive D is used in an amount of 5 to 600 mol % based on the amount of initiator B.

7. The process of claim 1, wherein the at least one further monomer A2 is selected from the group consisting of styrenes, isoprene, butadiene, and acrylates.

8. The process of claim 7, wherein the acrylates are of the formula:

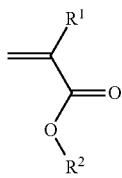

where, in each case independently of one another,

R¹ is hydrogen or an alkyl group, and

R² is a methyl, ethyl, n-propyl, isopropyl, n-butyl, isobutyl, tert-butyl, t-amyl, benzyl, cyclohexyl, 9-anthracenyl, 2-hydroxyethyl, 3-phenyl-2-propenyl, adamantyl, methyladamantyl, ethyladamantyl, isobornyl, 2-ethoxyethyl, n-heptyl, n-hexyl, 2-hydroxypropyl, 2-ethylbutyl, 2-methoxypropyl, 2-(2-methoxyethoxy), 2-naphthyl, 2-phenylethyl, phenyl, lauryl, myristyl, cetyl, stearyl, ceryl, isodecyl, 2-ethylhexyl, ethyltriglycol segment, tetrahydrofurfuryl, butyldiglycol, 2-dimethylaminoethyl, polyethylene glycol segment, methylpolyethylene glycol segment, or glycidyl.

9. The process of claim 1, wherein the molar fraction of the at least one hydroxystyrene monomer A1, based on the entirety of the at least one hydroxystyrene monomer A1 and the at least one further monomer A2 in the monomer mixture, is from 0.1 to 99.9 mol %.

10. The process of claim 1, wherein the at least one alkoxyamine B1 is selected from compounds having the following general formula

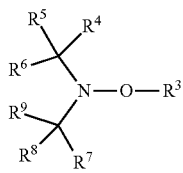

where, in each case independently of one another,

R³ is a group having at least one carbon atom which is in a position to enter into homolytic cleavage of the bond between oxygen atom and residue R³ and to form a radical .R³, the residue R³ being selected from the group consisting of 1-phenylethyl, tert-butyl, cyanoisopropyl, phenyl, and methyl, R⁴, R⁵, R⁷ and R⁸ are identical or different and are selected from the group consisting of linear, branched or cyclic and/or unsubstituted or substituted alkyl residues, the residues R⁴, R⁵, R⁷ and R⁸ being identical or different and being selected from the group consisting of methyl, ethyl, n-propyl, isopropyl, n-butyl, isobutyl, tert-butyl, neopentyl, benzyl, and cyclohexyl, or the moieties R⁴—C—R⁵ and R⁷—C—R⁸, via the radicals R⁴ and R⁵ and/or R⁷ and R⁸, form a cyclic structure which in turn may be substituted or unsubstituted, R⁶ and R⁹ are identical or different and are selected from the group consisting of linear, branched or cyclic and unsubstituted or substituted alkyl residues, or the moiety R⁶—C—N—C—R⁹, via residues R⁶ and R⁹, forms a cyclic structure which in turn is substituted or unsubstituted and/or fused to an aliphatic or aromatic ring system, the cyclic structure having one of the following general formulae

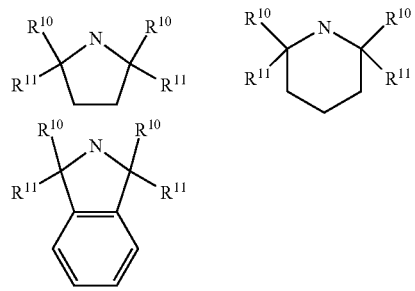

where, in each case independently of one another at each occurrence, R¹⁰ and R¹¹ are identical or different and are selected from the group consisting of linear or branched and/or unsubstituted or substituted alkyl residues, methyl, ethyl, n-propyl, isopropyl, n-butyl, isobutyl, tert-butyl, neopentyl, benzyl, cyclohexyl, and hydrogen.

11. The process of claim 1, wherein the at least one initiator B2 comprises at least one radical initiator selected from the group consisting of peroxides, azo compounds, dibenzoyl peroxide, cumene hydroperoxide, dicumyl peroxide, 1,1-di(tert-butylperoxy)cyclohexane, tert-amyl peroxyacetate, diisopropyl peroxydicarbonate, peroxodisulfates, azobis(isobutyronitrile); redox systems, and photoinitiators, and at least one nitroxyl radical selected from the group consisting of nitroxyl radicals having the following general formula

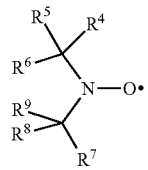

where, in each case independently of one another,

R⁴, R⁵, R⁷ and R⁸ are identical or different and are selected from the group consisting of linear, branched or cyclic and unsubstituted or substituted alkyl residues, the residues R⁴, R⁵, R⁷ and R⁸ being identical or different and being selected from the group consisting of methyl, ethyl, n-propyl, isopropyl, n-butyl, isobutyl, tert-butyl, neopentyl, benzyl, and cyclohexyl, or the moieties R⁴—C—R⁵ and/or R⁷—C—R⁸, via the radicals R⁴ and R⁵ and/or R⁷ and R⁸, form a cyclic structure which in turn is substituted or unsubstituted, R⁶ and R⁹ are identical or different and are selected from the group consisting of linear, branched or cyclic and unsubstituted or substituted alkyl residues, or the moiety R⁶—C—N—C—R⁹, via the residues R⁶ and R⁹, forms a cyclic structure which in turn is substituted or unsubstituted and/or fused to an aliphatic or aromatic ring system, the cyclic structure being selected from structures having the following general formulae

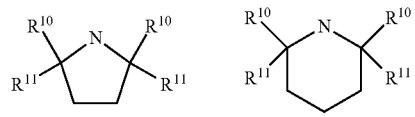

-continued

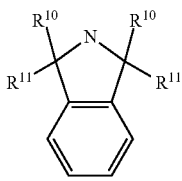

where in each case independently of one another at each occurrence; and

R[10] and R[11] are identical or different and are selected from the group consisting of linear or branched and/or unsubstituted or substituted alkyl residues, methyl, ethyl, n-propyl, isopropyl, n-butyl, isobutyl, tert-butyl, neopentyl, benzyl, cyclohexyl, and hydrogen.

12. The process of claim 1, wherein, based on the total amount of substance of monomers A1, or A1 and A2, the initiator B is used in an amount of 0.1 to 20 mol %.

13. The process of claim 1, wherein the at least one reactive agent C is selected from the group consisting of 2,6-di-tert-butyl-p-cresol, octadecyl 3-(3,5-di-tert-butyl-4-hydroxyphenyl)propionate, and 2,6-di-tert-butylphenol.

14. The process of claim 1, wherein the at least one reactive agent C is used in an amount of 10 to 1000 mol %, based on the concentration of initiator B.

15. The process of claim 1, wherein the mixture susceptible to radical polymerization comprises a solvent, the solvent being selected from the group consisting of PGMEA, ethyl acetate, toluene, xylene, ethylbenzene, anisole, acetone, 2-butanone, acetonitrile, dimethyl sulfoxide, tetrahydrofuran, dioxane, diethyl ether, tert-butyl methyl ether, pentane, hexane, heptane, cyclopentane, cyclohexane, methanol, ethanol, n-propanol, isopropanol, n-butanol, tert-butanol, ethylene glycol, propylene glycol, diethylene glycol, ethylene glycol monomethyl ether, ethylene glycol dimethyl ether, diethylene glycol monomethyl ether, diethylene glycol dimethyl ether, diethylene glycol monobutyl ether, and combinations thereof.

16. The process of claim 1, wherein the polymerization reaction is initiated thermally or actinically, and/or wherein the temperature for the initiation and/or polymerization reaction is adjusted to 60 to 180° C.

17. The process of claim 1, wherein after the conclusion of step c), the protecting group of the hydroxystyrene monomer A1 bonded in the polymer is eliminated.

18. The polymer prepared by the process of claim 1, wherein the molecular weight of said polymer remains unchanged by heating to a temperature between 100° C. and 130° C. over a time period of between 15 and 180 minutes.

* * * * *